Dec. 29, 1953 — A. A. LOMBARD ET AL — 2,663,994
ENGINE STARTER SYSTEM
Filed Oct. 11, 1952
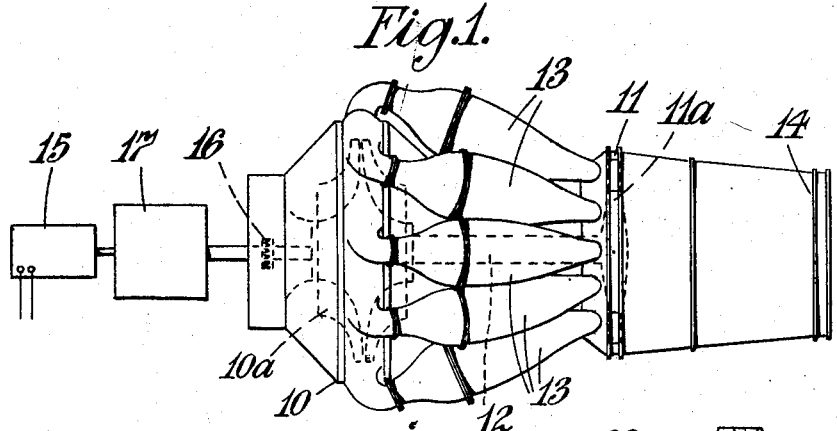
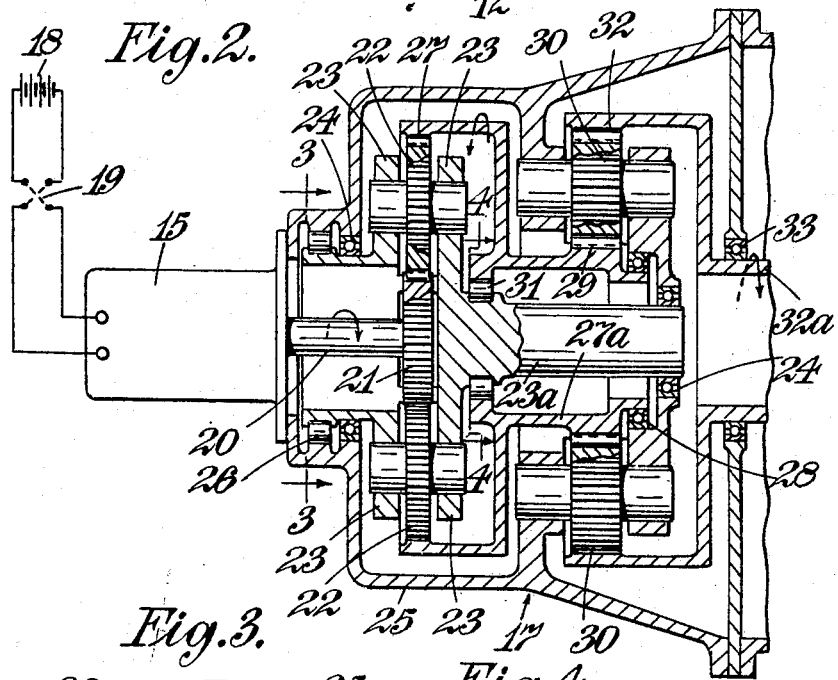
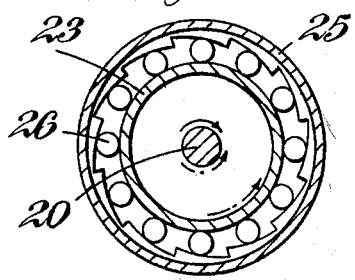
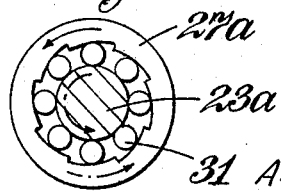
INVENTORS
A. A. LOMBARD &
D. H. MATTINSON
by Wilkinson Mawhinney
Attorneys

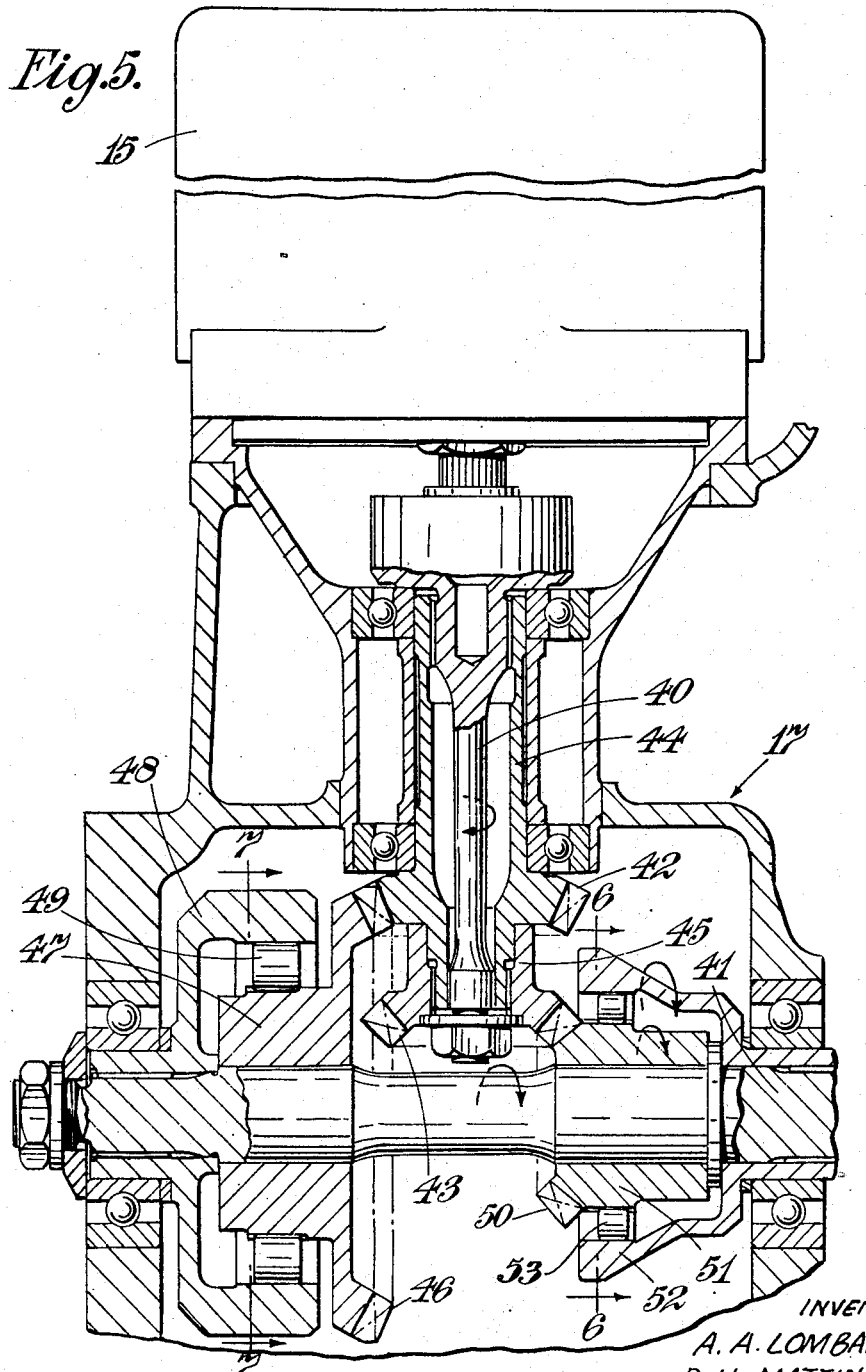

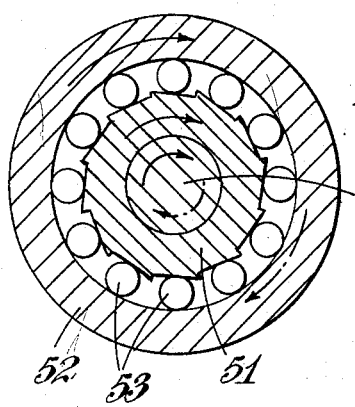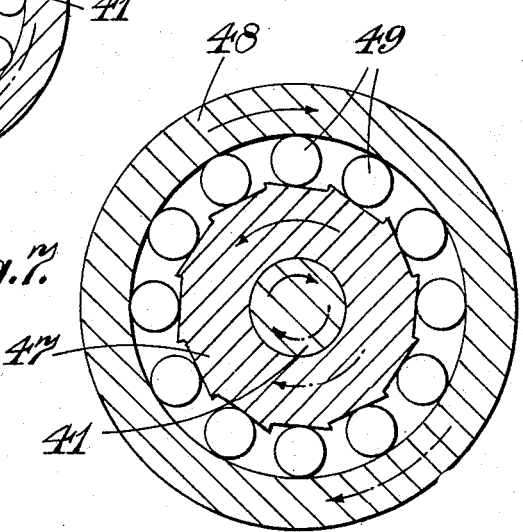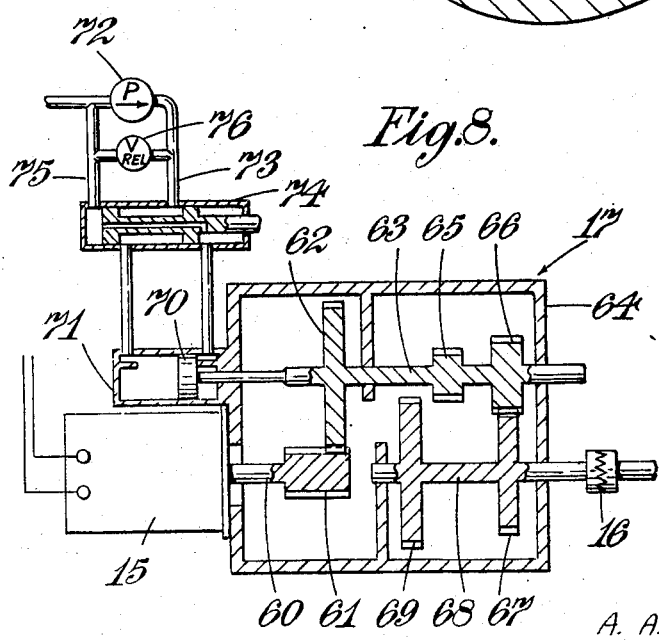

Patented Dec. 29, 1953

2,663,994

UNITED STATES PATENT OFFICE 2,663,994

ENGINE STARTER SYSTEM

Adrian Albert Lombard, Allestree, Derby, and Donald Hamilton Mattinson, Derby, England, assignors to Rolls-Royce Limited, Derby, England, a British company Application October 11, 1952, Serial No. 314,346

Claims priority, application Great Britain October 26, 1951

10 Claims. (Cl. 60—39.14)

This invention relates to engine starter systems for gas turbine aircraft propulsion engines. The primary object of the invention is to provide a starter system which will facilitate the starting of the engine in flight, particularly at high altitude.

According to the present invention, a starter system for an aircraft gas-turbine engine comprises a starter motor and a gear mechanism connected between the starter motor and the engine whereby during starting the motor drives a turbine/compressor rotor assembly of the engine, which gear mechanism comprises a first gear train giving a first ratio of motor rotational speed to rotor assembly rotational speed suitable for starting under normal ground conditions and a second gear train giving a second ratio less than the first ratio and suitable for starting the engine in flight, and means for selecting the desired gear train.

It has been appreciated that for the starting of aircraft propulsion gas-turbine engines at altitude, it is desirable to drive the compressor/turbine rotor assembly at a rotational speed which is higher than the rotational speed required for starting on the ground. At altitudes in excess of 25,000 ft. the difference in the rotational speeds necessary for starting becomes so marked that the ground starting mechanism may be ineffective for starting at altitude. Moreover, when an aircraft is in flight and an engine is not running, the engine rotor will usually be rotated by "windmilling" action. The windmilling speed may be higher than the maximum speed at which the starter motor is capable of rotating the rotor with a gear ratio suitable for ground starting. Thus the provision of the second ratio may enable the rotor to be driven by the starter motor despite "windmilling" of the rotor. This invention therefore provides an arrangement in which a single starter motor can be used with one gear train for starting on the ground and possibly also in flight at low altitude and with a second gear train for starting at high altitude.

The gear mechanism may be of any suitable form, such as an epicyclic gear, and the selection of gear train may be effected by selectively locking a part of the gear, such as an annular gear in the mechanism.

In one preferred embodiment of the invention the selection of the gear train to be used is effected by selection of the direction of rotation of the motor, the gear mechanism being arranged so that on rotation of the motor in one direction the output shaft connecting the starter system to the turbine/compressor rotor assembly rotates in the appropriate sense at a speed appropriate for normal ground starting, and that for rotation of the motor in the opposite direction the output shaft rotates in the same sense as in the first case but at a different ratio. A suitable gear mechanism having these characteristics comprises an epicyclic gear in which a planet carrier is restrained against rotation in one sense of rotation by means of a free wheel or ratchet, but is free for rotation in the opposite sense. In such arrangements, the selection of the desired gear ratio may be effected by reversal of an electrical input into an electric starter motor.

Three embodiments of the invention suitable for use with an aircraft propulsion gas-turbine engine of the simple reaction propulsion kind will now be described, the description referring to the accompanying drawings in which—

Figure 1 illustrates diagrammatically the simple engine with a starter mechanism, Figure 2 illustrates in section one embodiment of starter mechanism of this invention, Figures 3 and 4 are sections on the lines 3—3 and 4—4 respectively of Figure 2, Figure 5 is a view corresponding to Figure 2 of a second embodiment, Figures 6 and 7 are sections on the lines 6—6 and 7—7 respectively of Figure 5, and, Figure 8 is a sectional view of a third embodiment.

Referring to Figure 1 of the drawings, the engine illustrated is of a well-known kind and comprises a compressor 10 having a rotor 10a and a turbine 11 having a rotor 11a connected by a shaft 12 to drive the compressor rotor 10a. Compressed air is delivered from the compressor 10 into combustion equipment 13 to have fuel burnt with it and the products of combustion flow from the combustion equipment through the turbine 11 to operate it. The exhaust gases from the turbine 11 flow to atmosphere through a propelling nozzle 14.

The engine is started by rotating the rotor assembly 10a, 11a, 12 from an external power source to a rotational speed at which on combustion of fuel the engine becomes self driving. The external source of power is indicated at 15 and the clutch by which the power source is connected with the rotor assembly is indicated at 16.

In accordance with this arrangement of the invention a two-speed gear 17 is interposed between the motor 15 and rotor assembly 10a, 11a, 12 which gives ratios suitable for ground starting and for high level starting of the engine using the same power source 15.

Referring to Figures 2 to 4, the motor 15 is an electric motor of a reversible kind and is supplied with current from a source 18 through a reversing switch 19.

The starter motor 15 drives a shaft 20 carrying a sun wheel 21 which meshes with a plurality of planet wheels 22, the latter being borne in a planet carrier 23. The planet carrier 23 is borne in a stationary casing 25 by appropriate bearings 24, and there is provided a free-wheel clutch device 26 of any suitable type (illustrated as the roller type) which is operative between the planet carrier 23 and the casing 25. This free-wheel clutch device 26 will, for convenience, be referred to as "the first free-wheel."

The planet wheels 22 mesh with an internally-toothed annular gear 27 which is borne in the casing 25 in bearings 28 and has a cylindrical shaft extension 27a which is formed with external gear teeth as indicated at 29 to engage a plurality of pinions 30 which are rotationally borne in the casing 25 and are circumferentially disposed around the axis of rotation of the annular gear 27.

The planet carrier 23 has a shaft extension 23a within the cylindrical extension 27a of the annular gear 27 and is supported in one of the bearings 24 which is located in the casing 25 beyond the cylindrical extension 27a. A free-wheel coupling device 31, hereinafter referred to as "the second free-wheel", is provided between the annular gear extension 27a and the shaft extension 23a of the planet carrier 23, so that in one sense of relative rotation the annular gear 27 and planet carrier 23 are locked together, whilst in the other sense they are free for relative rotation.

The circumferentially-disposed pinions 30 mesh externally with a second internally-toothed annular gear 32 which has a shaft extension 32a borne in bearings 33 in the casing 25 and the shaft extension 32a is drivingly connected to the engine rotor assembly 10a, 11a, 12 through the clutch 16.

The operation of the gear mechanism is as follows:—Assume the starter motor 15 to be rotating in the clockwise direction, then the reaction of the starter motor driven sun wheel 21 on the planet carrier 23 is such as to lock the carrier 23 to the casing 25 through the first free wheel 26, and a drive is transmitted from the sunwheel 21, through planet wheels 22 and first annular gear 27 to the cylindrical extension 27a and thence to the circumferentially-disposed pinions 30 and the second internally-toothed annular gear 32 to drive the engine rotor assembly in the clockwise direction. When this gear train is operative the second free-wheel 31 permits relative rotation of the first annular gear 27 with respect to the shaft extension 23a on the planet carrier 23. By suitable choice of gear diameters the rotational speed of the engine rotor assembly can be say approximately ⅕th of the motor speed.

When the motor rotates in the anti-clockwise sense the first free-wheel 26 permits rotation of the planet carrier 23 relative to the casing 25. However, the second free-wheel 31 locks the planet carrier 23 to the first annular gear 27, so that the sun pinion 21, planet wheels 22, planet carrier 23 and first annular gear 27 rotate as one, and the drive is transmitted from cylindrical extension 27a on the first annular gear 27 through the pinions 30 and the second annular gear 32 to the rotor assembly, which rotates clockwise. A second ratio of speed reduction in the drive between the motor 15 and the engine rotor assembly is thus obtained and this reduction may, by suitable choice of gear diameters, be such that the engine rotates at approximately one half the speed of the starter motor.

In the arrangement described, the selection of the desired gear ratio is automatically made by selection of the sense of rotation of the starter motor 15.

In Figures 3 and 4 the full line arrows indicate the directions of rotation of the adjacent parts during clockwise rotation of the shaft 20 and the chain line arrows indicate the directions of rotation of the adjacent parts on anticlockwise rotation of the shaft 20.

Referring now to Figures 5 to 7, there is illustrated another arrangement suitable for use with a reversible motor 15.

In this construction the gear mechanism comprises an input shaft 40 driven by the motor 15, the axis of the shaft being at right angles to the axis of the output shaft 41 of the gear mechanism.

The shaft 40 has secured to it a pair of bevel gears 42, 43, whereof the bevel gear 42 is formed on a sleeve 44 splined on the shaft 40 to rotate therewith and whereof the bevel gear 43 is formed on a sleeve 45 splined to the sleeve 44.

The bevel gear 42 meshes with a bevel gear 46 mounted on but freely rotatable with respect to the output shaft 41, and the bevel gear 46 has an axial extension 47 formed as the driving member of a free-wheel coupling whereof the driven member 48 is splined to the output shaft 41 to rotate therewith. The free-wheel coupling may be of any convenient kind and is illustrated as being of the jamming-roller type, the driving member 47 being formed with a series of inclined flats which are engaged by rollers 49 which also engage the inner surface of the driven member 48 so that when the driving member 47 rotates clockwise, as viewed in Figure 7, a drive is transmitted by the rollers 49 from the driving member 47 to the driven member 48.

The bevel gear 43 meshes with a further bevel gear 50 which is mounted on the output shaft 41 being freely rotatable thereon and the bevel gear 50 has an extension 51 formed as the driving member of a second free-wheel coupling whereof the driven member 52 is splined to the output shaft to rotate with it. This free-wheel coupling device may also be of any convenient kind and is again illustrated a free-wheel coupling of the jamming-roller type, the rollers being indicated at 53. The second free-wheel coupling device 51, 52, 53 is arranged to transmit a drive when the first free-wheel coupling device 47, 48, 49 is over-running, and so, since the bevel gear 50 is disposed on the opposite side of the axis of the input shaft 40 to the bevel gear 46, the inclined flats on the driving member 51 are inclined in the same way as those on the driving member 47 when viewed axially of the output shaft 41.

The operation of this construction is as follows. On clockwise rotation of the input shaft 40, as viewed from above, the bevel gear 43 drives its meshing bevel gear 50 in a clockwise direction as viewed in Figure 6, and so a drive is transmitted from the bevel gear 50 through the free-wheel coupling 51, 52, 53 to the output shaft 41. During clockwise rotation of the shaft 40 the bevel gear 46 is rotating in an anti-clockwise direction and so no drive is transmitted through the free-wheel coupling device 47, 48, 49. The directions of rotation of the parts for clockwise rotation of the input shaft 40 is indicated by full line arrows in Figures 6 and 7. It will be noted that the output shaft rotates in a clockwise direction, as viewed in Figures 6 and 7.

On anti-clockwise rotation of the input shaft 40 due to reversal of the motor 15 the bevel gear 50 is driven in an anti-clockwise direction and so the free-wheel coupling 51, 52, 53 over-runs. However, during anti-clockwise rotation of the input shaft 40 the bevel gear 46 rotates in a clockwise direction as seen in Figure 7 and so the free-wheel coupling 47, 48, 49 locks and a drive is transmitted from the bevel gear 46 through the coupling to the output shaft 41 which is rotated in a clockwise direction as viewed in Figures 6 and 7.

By suitable selection of the reduction ratios afforded by the two sets of bevel gears 42, 46, and 43, 45, the output shaft 41 and thus the engine rotor assembly may be driven at a rotational speed suitable for ground starting for one direction of rotation of the motor 15, and may be driven at a speed suitable for high altitude starting for the opposite direction of rotation of the motor 15.

Referring now to Figure 8, there is illustrated an arrangement suitable for use with an irreversible motor which is illustrated for convenience as an electric motor but which may be a turbine motor.

In this construction the motor 15 drives the engine rotor assembly through a simple two-change speed gear.

The gear mechanism is illustrated as comprising an input shaft 60 carrying a first gear 61 which meshes with a gear 62 rotatable with a shaft 63 axially slidable within the casing structure 64 of the gear mechanism. The shaft 63 also has rotatable with it a pair of gears 65 and 66 of which gear 66 meshes with a gear 67 carried on an output shaft 68 of the gear mechanism in one position of the axially-displaceable shaft 63, and of which the gear 65 meshes with a gear 69 when the shaft 63 is in a second position in which the gears 66 and 67 are out of engagement, the gear 69 also being rotatable with the output shaft 68.

In operation, the desired gear ratio is selected by displacing the shaft 63 axially of itself.

Axial movement of the shaft 63 can be effected in any convenient manner and is shown as being effected by a hydraulic ram comprising a piston 70 working in a cylinder 71 and connected with the shaft 63 to move it axially, and pressure fluid supply comprising a pump 72 supplying pressure fluid through a pipeline 73 past a changeover valve 74 to the cylinder 71, return fluid from the cylinder 71 being conveyed past the changeover valve 74 through a return pipe 75 back to the inlet of the pump 72. A relief valve 76 is provided to prevent development of excessive pressures in the system.

What we claim is:

1. A starter system for an aircraft gas-turbine engine comprising a starter motor and a gear mechanism connected between the starter motor and the engine whereby during starting the motor drives a turbine/compressor rotor assembly of the engine, which gear mechanism comprises a first gear train giving a first ratio of motor rotational speed to rotor assembly rotational speed suitable for starting under normal ground conditions and a second gear train giving a second ratio less than the first ratio and suitable for starting the engine in flight, and means for selecting the desired gear train.

2. A starter system for an aircraft gas-turbine engine comprising a reversible starter motor and a gear mechanism connected between the reversible starter motor and the engine whereby during starting the reversible motor drives a turbine/compressor rotor assembly of the engine, which gear mechanism comprises a first gear train giving a first ratio of motor rotational speed to rotor assembly rotational speed suitable for starting under normal ground conditions and a second gear train giving a second ratio less than the first ratio and suitable for starting the engine in flight, and which gear mechanism is arranged so that on rotation of the reversible motor in one direction the drive is transmitted through the first gear train and that on rotation of the reversible motor in the reverse direction the drive is transmitted through the second gear train, and means for selecting the direction of rotation of the reversible starter motor thereby to select the desired gear train.

3. A starter system as claimed in claim 2, wherein each of said gear trains comprises in it a free-wheel clutch device and wherein the free-wheel clutch device of the first gear train is arranged to transmit a drive when the free-wheel clutch device of the second gear train is over-running, and the free-wheel clutch device of the second gear train is arranged to transmit a drive when the free-wheel clutch device of the first gear train is over-running.

4. A starter system as claimed in claim 2, wherein the gear mechanism comprises stationary structure, an input shaft, a sun wheel driven by the input shaft, planet wheels meshing with the sun wheel, a planet carrier for said planet wheels, a first free-wheel clutch device between said planet carrier and stationary structure whereby said planet carrier is restrained against rotation in one direction but is free for rotation in the opposite direction, an annular gear meshing with said planet gears, a second free-wheel clutch device operative between said planet carrier and said annular gear to lock them together on rotation of the planet carrier in said opposite direction, an output shaft and means to drive said output shaft from the annular gear.

5. A starter system as claimed in claim 4, wherein said means to drive the output shaft from said annular gear comprises a gear wheel driven by said annular gear, a plurality of pinions circumferentially disposed around said gear wheel and in mesh therewith, a second annular gear meshing with said pinions, said second annular gear having an extension affording an output shaft for the gear mechanism.

6. A starter system as claimed in claim 2, wherein said gear mechanism comprises an input shaft, a first gear and a second gear mounted on said input shaft, an output shaft, a third gear and a fourth gear mounted on said output shaft and meshing with the first gear and the second gear respectively, a first free-wheel clutch device associated with the first and third gears, and arranged so that a drive is transmitted from the input shaft through said first and third gears to said output shaft on rotation of the input shaft in one direction, and a second free-wheel clutch device associated with said second and fourth gears and arranged so that a drive is transmitted from the input shaft to the output shaft through said second and fourth gears on rotation of the input shaft in the opposite direction.

7. A starter system as claimed in claim 6, wherein said first gear, said second gear, said third gear and said fourth gear are bevel gears and the input shaft has its axis at right angles to the axis of the output shaft.

8. A starter system as claimed in claim 7, wherein said third gear and said fourth gear are mounted on said output shaft in axially-spaced relation with respect to one another and one on each side of the axis of the input shaft.

9. A starter system as claimed in claim 8, wherein said third gear and said fourth gear are mounted to be free for relative rotation with respect to the output shaft each in one direction of rotation and the first and second free-wheel clutch devices are arranged to be operative between the output shaft and the third gear, and between the output shaft and the fourth gear respectively.

10. A starter system as claimed in claim 1, wherein the motor is an irreversible motor and the gear mechanism is a two-ratio change-speed gear.

ADRIAN ALBERT LOMBARD.
DONALD HAMILTON MATTINSON.

No references cited